United States Patent [19]

Hadermann

[11] Patent Number: 4,510,304
[45] Date of Patent: Apr. 9, 1985

[54] POLYMER FRACTIONATION

[75] Inventor: Albert F. Hadermann, Ijamsville, Md.

[73] Assignee: General Technology Applications, Inc., Reston, Va.

[21] Appl. No.: 429,804

[22] Filed: Sep. 30, 1982

[51] Int. Cl.³ ............................................. C08F 6/04
[52] U.S. Cl. ...................................... 528/481; 44/62; 528/502
[58] Field of Search ................................ 528/481, 501

[56] References Cited

U.S. PATENT DOCUMENTS 2,993,020  7/1961  Carpenter ........................ 524/526
3,790,538  2/1974  Schön ............................. 524/831

Primary Examiner—Christopher A. Henderson
Attorney, Agent, or Firm—Roland H. Shubert

[57] ABSTRACT

Soluble polymers are fractionated according to molecular weight by cryogenically comminuting the polymer and introducing the polymer particles, while still in the active state induced by cryogenic grinding, into a liquid having a solvent power selected to produce a coacervate fraction containing high molecular weight polymer species and a dilute polymer solution containing lower molecular weight polymer species. The coacervate may be physically separated from the solution and finds use in the production of antimisting jet fuels and the like.

10 Claims, 1 Drawing Figure

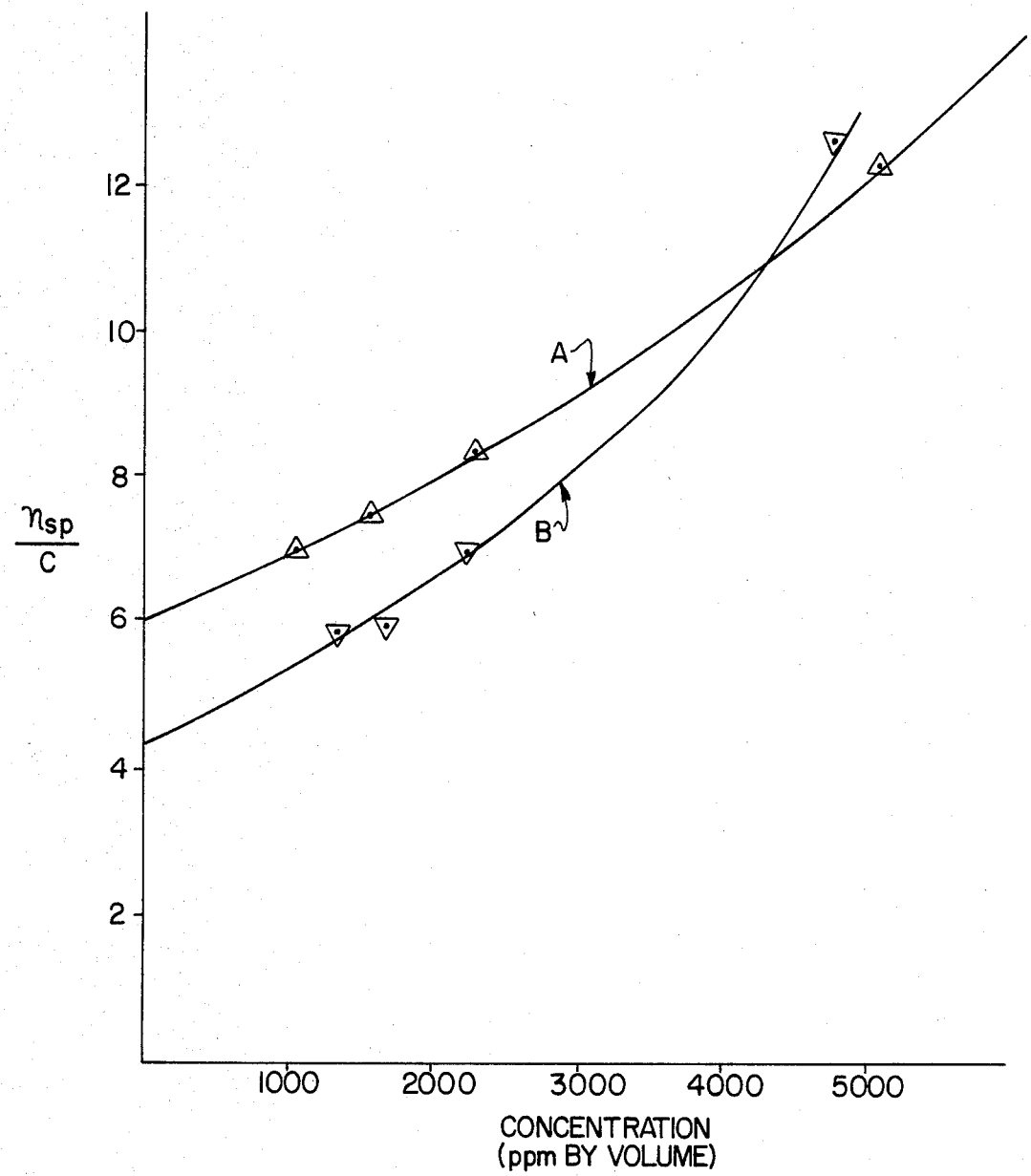

POLYMER FRACTIONATION

BACKGROUND OF THE INVENTION

Typical commercial polymers, particularly the rubbery, thermoplastic polymers such as polyisobutylene, polybutadienes and the like, encompass a fairly broad molecular weight range. A number of different techniques have been developed to fractionate such polymers according to molecular weight. Recognized methods for polymer fractionation include fractionation by solubility differences; by chromatography; by sedimentation; by diffusion; by ultrafiltration through porous membranes; and by zone melting. All of these methods are restricted in practical use because they are slow, expensive and difficult if not impossible to scale up to any reasonably large production rate.

Perhaps because of the difficulty and expense of obtaining high molecular weight fractions of common polymers, no significant commercial market for these polymer fractions has developed. However, it is now recognized that high molecular weight fractions of certain polymers provide unique advantages in specific applications. For example, the polymer weight concentration in a hydrocarbon required to enhance the rate of fluid flow through a conduit or to impart antimisting properties to jet fuels, kerosene and diesel fuels is an inverse and exponential function of molecular weight. In the case of polyisobutylene used as an antimisting additive to kerosene, it has been empirically determined that less than 50 ppm of a 5 million molecular weight polymer provides an antimisting effectiveness equal to about 1000 ppm of a 3 million molecular weight fraction.

Focusing now on those fractionation methods which utilize solubility differences to achieve separation, all of those methods first require that the polymer be dissolved in a suitable solvent. The solution process especially for relatively high molecular weight polymers, is very slow, often taking days to weeks. The polymer when immersed in a solvent first swells to a gel-like state and then slowly disperses to form a solution. The rate of solution can be speeded by heating, agitation, or both but at the cost of polymer degradation and a reduction of the average molecular weight. Hence, if the object of the fractionation process is to recover a high molecular weight fraction, all attempts to speed dissolution reduce the quality of the desired fraction.

After a polymer solution has been obtained, fractions of differing molecular weights can be separated from the solution in several different ways. One approach to separating a high molecular weight fraction is to add to the polymer solution a miscible non-solvent, typically acetone. The non-solvent causes precipitation of a solvent-rich polymer gel which may be removed by decantation. Successive additions of non-solvent, if properly controlled, results in the successive precipitation of polymer fractions of progressively decreasing molecular weight. Another method of separating polymer fractions is to add a quantity of non-solvent to the polymer solution and to thereafter obtain successive fractions of decreasing molecular weight by evaporating off portions of the more volatile solvent. Yet another approach is to essentially saturate a solution with polymer at a moderately elevated temperature and to thereafter cool the solution thereby precipitating out a high molecular weight fraction of the dissolved polymer. A small quantity of non-solvent may be added here as well to improve the fractionation obtained.

Traditional methods of dissolving polymers in solvents, as noted previously, usually require an extended time period for completion. There has recently been developed a technique for the very rapid dissolution of polymers in compatible liquids. This technique, disclosed and claimed in U.S. Pat. No. 4,340,076, the disclosure of which is incorporated by reference herein, comprises the cryogenic comminution of polymers to form activated particulates which are thereafter admixed with a suitable liquid solvent. The active polymer particles dissolve very rapidly, essentially instantaneously, in the solvent liquid with minimal degradation of the polymer or reduction of its average molecular weight.

SUMMARY OF THE INVENTION

A solid polymer is separated into at least one high molecular weight fraction and a lower molecular weight fraction by cryogenically comminuting the polymer and admixing it with a liquid displaying a selected solvent power toward the polymer. Upon admixing, there is formed a two phase system; a dense phase comprising a polymer-rich coacervate or gel formed by the less soluble high molecular weight fractions of the polymer and a dilute phase comprising a solution of lower molecular weight polymer in the liquid. Separation of the coacervate phase from the polymer solution may be accomplished by decantation. Solvent power of the liquid toward the polymer may be controlled by solvent selection, by admixing a minor quantity of a miscible non-solvent to a major quantity of a good polymer solvent or by controlling the temperature of the solvent liquid when admixed with the polymer particles. The recovered high molecular weight coacervate fraction may, without further processing, be utilized as an antimisting additive in hydrocarbon fuels, as an additive to enhance fluid flow of hydrocarbons through conduits or to blend with other materials systems. Alternatively, the coacervate fraction may be dried as under vacuum to drive off the solvent and recover high molecular weight polymer.

Hence, it is an object of this invention to provide a process for polymer fractionation.

It is another object of this invention to separate and recover a high molecular weight fraction of a solid polymer encompassing a wide range of molecular weight.

Yet another object of this invention is to produce a high molecular weight gel or coacervate, which may be blended with hydrocarbons to enhance flow of the hydrocarbons and to reduce the tendency of the hydrocarbons to mist upon exposure to a flowing gas stream.

BRIEF DESCRIPTION OF THE DRAWING

The single FIGURE comprises a plot showing the molecular weight differences of polymer fractions obtained by the process of this invention.

DESCRIPTION OF PREFERRED EMBODIMENTS

The process of this invention is applicable for use with all solid polymers encompassing a range of molecular weights and displaying a significant degree of solubility in a liquid. It will be described with specific reference to polyisobutylene, a polymer which is slow to dissolve and difficult to fractionate using traditional methods.

Polyisobutylene is commercially available in grades having a solution average molecular weight in excess of 5 million. The polymer is soluble in hydrocarbons including light petroleum solvents, diesel and jet fuels and crude oil. It is also soluble in chlorinated hydrocarbons such as carbon tetrachloride and polychlorinated biphenyls. The polymer displays a substantially lesser degree of solubility in alcohols, ethers, ketones, and similar polar liquids.

In its broadest sense, this process comprises first the cryogenic comminution of a solid polymer to obtain particles displaying enhanced solvation activity. The polymer particles while still in the highly active state induced by cryogenic comminution are then added directly to a liquid of selected solvent power toward the polymer. The solvent power of a liquid, as used herein, is an empirical measure of the degree and rate of solubility of a polymer in the liquid. Solvent power of the liquid is selected, or adjusted to be, such that polymer addition results in the very rapid, almost instantaneous, development of a two-phase system within the liquid. One phase consists of a gel-like coacervate fraction which is rich in the high molecular weight portion of the polymer. The other phase consists of a solution of polymer in the liquid and includes generally the lower molecular weight portion of the polymer. In most polymer-liquid systems, the coacervate fraction displays a higher specific gravity than does the polymer solution and hence sinks allowing its removal by simple decantation.

Solvent power of the liquid can be selected or adjusted in several ways. Different types or classes of organic liquids display differing solubility relationships toward any particular polymer. Hence, the desired solvent power may be achieved by proper selection of the liquid. A generally more convenient approach is to utilize a mixture of two different liquids. One of the liquids comprises an excellent solvent for the polymer being fractionated while the other liquid is one which is a very poor solvent, or non-solvent, toward the polymer. The two liquids must, of course, be miscible one with the other. Adjustment of the ratio of good solvent and non-solvent allows the selection of any desired degree of solvent power toward the polymer being fractionated.

In the case of polyisobutylene, for example, the excellent solvent may conveniently comprise a hydrocarbon compound such as isooctane or a mixture of hydrocarbon compounds such as a petroleum naphtha fraction. The non-solvent conveniently may be an oxygenated compound including various lower alcohols, ketones and ethers. Ordinarily, the non-solvent makes up a minor fraction of the total liquid. For example, in the fractionation of polyisobutylene using a solvent power-adjusted liquid comprising an isooctane-acetone mixture, the acetone would comprise about 1% or less of the total liquid.

Another technique which may be employed to adjust the solvent power of the liquid is to change its temperature. Solubility of a polymer in a liquid is temperature dependent, the solubility increasing with an increase in temperature. Temperatures of the liquid solvent which may be used in this process may range from just below the boiling point of the liquid to just above its pour point.

As a polymer is dissolved in a solvent, the viscosity of the resulting solution increases. With polyisobutylene, for example, solutions of a moderately high (4 to 5 million) molecular weight polymer in a hydrocarbon liquid such as jet fuel are barely pourable at polymer concentrations of about 2% and temperatures in the ambient range. For this reason the amount of polymer added to the liquid is limited to that which produces a readily decantable or separable polymer solution-coacervate system even if the liquid is capable of dissolving additional polymer. This limiting concentration is a function of the molecular weight of the dissolved polymer. In most cases, a practical maximum concentration of polymer will range from about 0.3% to about 1.5%. In all cases, the coacervate fraction formed will display a considerably higher polymer concentration than does the polymer solution.

The coacervate fraction, because of its higher specific gravity and coherent gel-like consistency, may be readily separated from the polymer solution by decantation and similar mechanical techniques. The coacervate as separated from the polymer solution is a useful product in that form. It may be blended directly with a jet fuel or diesel fuel to produce anti-misting or fire safe fuels for aviation and military use or may be blended with hydrocarbons flowing through a conduit to reduce the friction and increase the flow rate. For both of these uses, the concentration of polymer required to achieve the desired result is a function of molecular weight; the higher the molecular weight, the lower the polymer concentration required. Recent experimental evidence suggests that antimisting properties can be achieved in jet and diesel fuels with polymer concentrations of about 100 ppm or even less using high molecular weight fractions of commercial polyisobutylene. A concentration some ten times or more greater is required to achieve the same level of anti-misting properties using the same commercial polyisobutylene in its unfractionated form. Polymer concentrations required to achieve substantial i.e., 30% to 50%, drag reduction of hydrocarbon liquids flowing through a pipeline also are dependent upon molecular weight but are generally in the range of about 10 ppm to 100 ppm.

The coacervate fraction may be further processed before use as well. It may be dissolved in any appropriate solvent and the resulting solution may be used for film formation and the like. If a pure polymer is desired, the coacervate may be subjected to vacuum drying to remove solvent. If further fractionation is desired, the coacervate may be frozen, subjected again to cryogenic comminution, and dispersed into a liquid of selected solvent power to obtain a fraction of even higher molecular weight.

Either batch or continuous techniques may be used in carrying out the process of this invention. In a continuous mode, a stream of cryogenically comminuted polymer particles is added to a flowing solvent stream to form a coacervate fraction and a lower molecular weight polymer solution. After separation of the coacervate from the solution, the polymer solution may be further processed as by distillation to recover and recycle solvent. Alternatively, the polymer solution may find use as an adhesive base or the like and may be treated as a marketable product of the process.

The following examples illustrate specific embodiments of the invention.

EXAMPLE 1

A quantity of commercial polyisobutylene having a solution average molecular weight of about 4,700,000 was cryogenically ground in a hammer mill using liquid nitrogen as the refrigerant. The resulting polymer powder, while still at essentially liquid nitrogen temperature, was introduced into a liquid mixture of isooctane (2, 2, 4-trimethylpentane) and acetone. Acetone concentration was 0.80 weight percent.

Upon addition of the polyisobutylene particles to the liquid, there was immediately formed a gel-like coacervate which settled to the bottom of the vessel. The supernatant polymer solution had a polymer concentration of about 0.3%.

The coacervate was separated from the supernatant solution by decantation and was then vacuum dried at ambient temperature overnight. A portion of the dried polymer was then dissolved in isooctane in conventional fashion over a 3-day period with periodic heat assist; i.e., heating the polymer and solvent to about 98° C. and allowing it to cool. A sample of the original polyisobutylene was dissolved in isooctane in identical fashion.

Thereafter, viscosity measurements were made on both samples at several different concentration levels at a temperature of 100° F. The measured viscosities of each sample were plotted and the resulting curves were extrapolated to a zero concentration to obtain intrinsic viscosity values which are a function of molecular weight. This plot is reproduced in the drawing. Curve A represents the results obtained from the polymer solution derived from the coacervate fraction. Curve B represents the results obtained from the solution of the original polymer. As is shown by values of the two curves extrapolated to zero concentration, the coacervate fraction displayed a substantially higher molecular weight than did the original polymer.

EXAMPLE 2

A sample of the same polyisobutylene as was used in Example 1 was cryogenically comminuted in a hammer mill using liquid nitrogen as the refrigerant. The ground polymer was added to a mixture of isooctane and acetone; the acetone concentration being about 0.5%. Coacervate formation was observed immediately upon introduction of the cryoground polymer.

Coacervate was separated from the polymer solution by decantation. Pure isooctane was then added to the coacervate and was stirred for about 20 seconds with breaking up of the gel into small fragments. The mixture was then allowed to settle for 30 minutes and a second decantation was then performed.

The two polymer solutions were then tested for their viscoelastic properties using a ductless siphon. This technique provides an empirical measure of viscoelasticity which in turn is a function both of polymer concentration and of polymer molecular weight. A ductless siphon comprises an open-ended, downwardly pointing capillary connected to a vacuum source. The test is conducted by touching the surface of the liquid to be tested to the open bore of the capillary. The liquid surface is then slowly retracted downwardly until the column of liquid between the capillary end and the liquid surface breaks or collapses. Height of the liquid column at break is the unit of measurement.

After correcting for concentration effects, it was found that the solution of coacervate in isooctane was at least 2.5 times as effective in enhancing the viscoelastic properties of isooctane as was the polymer dissolved in the supernatant liquid formed with the coacervate. This result shows that the polymer contained in the coacervate fraction was enriched in the higher molecular weight portion of the total polymer sample.

The above examples illustrate the use of a good solvent—non-solvent mixture to obtain the desired liquid solvent power to effect coacervate formation. Because solubility of a polymer in most liquids is temperature sensitive, temperature can be used to adjust solvent power of the liquid. In this embodiment, a liquid (which may be a good solvent—non-solvent mixture) having limited solubility toward the polymer at low temperature is heated to a relatively high temperature; conveniently just below its boiling point. Sufficient cryogound polymer is then added to the heated liquid to essentially saturate the liquid at that temperature. The solution is then cooled, resulting in coacervate formation. Because the higher molecular weight polymer species are less soluble than those of lower molecular weight, the coacervate is enriched in the higher molecular weight species. Separation of the coacervate may be accomplished by decantation as before.

Other modifications of the disclosed invention may be made within the scope of the following claims without departing from the spirit of the invention.

I claim:

1. A method for obtaining a high molecular weight fraction of a hydrocarbon soluble, rubbery, thermoplastic polymer which comprises:
   cryogenically comminuting said polymer to obtain discrete particles displaying a high surface energy state;
   admixing said polymer particles while still in said high energy state with a liquid of adjusted solvent power toward said polymer so as to obtain upon admixing said polymer with the liquid a high molecular weight, polymer-rich coacervate fraction and a lower molecular weight polymer solution; and
   separating said coacervate fraction from said polymer solution.

2. The method of claim 1 wherein the solvent power of said liquid is adjusted by admixing a minor amount of a non-solvent and a major amount of a good solvent, the non-solvent and good solvent being miscible one with the other.

3. The method of claim 2 wherein the non-solvent comprises an oxygenated hydrocarbon liquid and the good solvent comprises a hydrocarbon liquid.

4. The method of claim 3 wherein said non-solvent is acetone.

5. The method of claim 1 wherein the solvent power of said liquid is adjusted by adjusting the temperature of the liquid.

6. The method of claim 1 wherein said separated coacervate fraction is blended with a hydrocarbon flowing through a conduit in sufficient amount to reduce the friction resulting from said flow.

7. The method of claim 1 wherein said polymer is polyisobutylene.

8. The method of claim 1 wherein cryogenically comminuted polymer, while still at or near cryogenic temperature is continuously added to a flowing liquid stream.

9. The method of claim 1 wherein said coacervate fraction is frozen and cryogenically comminuted and is thereafter admixed with a liquid of selected solvent power to obtain a second coacervate of further enhanced molecular weight.

10. The method of claim 1 wherein polymer is recovered from said coacervate fraction by vacuum drying.

* * * * *